United States Patent [19]

Inoue

[11] 4,357,516
[45] Nov. 2, 1982

[54] EDM METHOD AND APPARATUS UTILIZING SUCCESSIVE TRAINS OF ELEMENTARY PULSES WITH CONTROLLED PULSE-OFF PERIODS

[75] Inventor: Kiyoshi Inoue, Tokyo, Japan

[73] Assignee: Inoue-Japax Research Incorporated, Yokohama, Japan

[21] Appl. No.: 163,795

[22] Filed: Jun. 27, 1980

[30] Foreign Application Priority Data

Jun. 30, 1979 [JP] Japan .................................. 54-83013

[51] Int. Cl.³ .............................................. B23K 1/08
[52] U.S. Cl. .............................. 219/69 M; 219/69 P; 219/69 C
[58] Field of Search .................. 219/69 P, 69 M, 69 C

[56] References Cited

U.S. PATENT DOCUMENTS

| | | | |
|---|---|---|---|
| Re. 29,589 | 3/1978 | Inoue | 219/69 P |
| 3,558,842 | 1/1971 | Livshits et al. | 219/69 P |
| 3,943,321 | 3/1976 | Pfau et al. | 219/69 P |
| 4,071,729 | 1/1978 | Bell, Jr. | 219/69 C |
| 4,236,057 | 11/1980 | Inoue | 219/69 P |

FOREIGN PATENT DOCUMENTS 39-20494  9/1964  Japan .
44-8317  4/1969  Japan .

*Primary Examiner*—C. C. Shaw
*Attorney, Agent, or Firm*—Karl F. Ross

[57] ABSTRACT

EDM method and apparatus in which the electrical discharge machining pulses are produced by the application across the machining gap of a succession of time-spaced trains A of discrete elementary pulses a having an on-time τon and off-time τoff, the trains having a duration Ton and an interval Toff. In a machining process, upon occurrence of an arcing, short-circuiting or excessive gap contamination condition, either of the off-time τoff or the cut-off interval Toff is increased. When the one controlled time τoff or Toff is increased to be greater than a predetermined value, the other, Toff or τoff, is decreased generally inversely proportionally to the increased τoff or Toff. When τoff or Toff is decreased to be smaller than a predetermined level, Toff or τoff are increased. Preferably, the sum of total off-times τoff plus the cut-off interval Toff in a single cycle or period of successive trains A is maintained at a present value so that the mean machining current is maintained constant as desired.

15 Claims, 4 Drawing Figures

EDM METHOD AND APPARATUS UTILIZING SUCCESSIVE TRAINS OF ELEMENTARY PULSES WITH CONTROLLED PULSE-OFF PERIODS

FIELD OF THE INVENTION

The present invention relates to an electrical-discharge machining (EDM) method and apparatus and, more particularly, to an improved method of and apparatus for the electrical-discharge-machining of a workpiece juxtaposed with a tool electrode across a fluid-filled machining gap by applying across the machining gap pulse trains individually consisting of high-frequency, discrete elementary pulses of on-time ($\tau$on), and off-time ($\tau$off), the pulse trains having a duration (Ton) with the successive trains being separated by a cut-off time interval (Toff).

BACKGROUND OF THE INVENTION

In the EDM process, electric energy is supplied in the form of discrete electrical pulses across the machining gap filled with a machining fluid or liquid dielectric (e.g., kerosene, transformer oil, distilled water or weekly conductive water) to effect a succession of electrical discharges between the tool electrode and the workpiece to remove material from the latter. As material removal proceeds, the tool electrode is advanced relatively towards the workpiece by servo feed means adapted to maintain the machining gap spacing substantially constant and thereby to allow material-removal discharges to be successively created. The contamination of the machining gap region with chips, tar and gases produced by machining discharges may be clarified by continuously or intermittently flushing the gap with a fresh machining fluid and/or intermittently or cyclically retracting the tool electrode away from the workpiece to allow the fresh machining medium to be pumped into the machining gap and the machining contaminants to be carried away from the latter.

Parameters of individual and successive electrical discharges, i.e. pulse on-time $\tau$on, peak current Ip and off-time $\tau$off are, for a given combination of electrode materials, determinative of machining results, e.g. removal rate, surface roughness and relative electrode wear and, therefore, are individually or in combination adjusted to establish a particular machining condition suitable to achieve desired machining results.

As proposed by the present inventor in Japanese Patent Specification No. 39-20494 published Sept. 19, 1964 and No. 44-8317 published Apr. 18, 1969, there is known an improved EDM pulse supply technique in which a succession of pulse trains individually consisting of discrete elementary pulses of short on-time ($\tau$on) and off-time ($\tau$off) occurring at a high frequency, say, 10 kHz to 100 kHz, are applied across the machining gap, the pulse trains occurring at a low frequency, say, 100 Hz and having a longer duration (Ton) with the successive trains being separated by a longer cut-off time interval (Toff). Elementary pulses in each train may be modified as to their triggering or peak voltage as described in the aforementioned Japanese Patent Specification No. 44-8317. Other have also proposed various circuits generally of this or similar genre, which are described, for example, in U.S. Pat. Nos. 3,056,065 and 3,943,321.

Fine-surface and precision machining results are obtained with a train of elementary pulses of a duration $\tau$on set to be short and preferably at a minimum which, when repeated at a high frequency and with a pulse interval $\tau$off set to be at most equal in length to the pulse duration $\tau$on, permits an increased removal rate to be obtained. The shortness of the pulse interval $\tau$off may, however, cause the production of machining gap chips and other products to bring about a continuous arc discharge with ease within a short time period. This possibility can advantageously be eliminated or alleviated by the presence of cut-off time periods Toff which separate from one another the successive trains Ton of elementary pulses ($\tau$on, $\tau$off). Thus, the cyclic interruption of elementary pulses allows accumulated machining products to be carried away substantially within each interruption period from the machining gap and may thereby serve to maintain the latter from continued contamination. By establishing the cut-off interval Toff at a level sufficient to allow clarification of the contaminants resulting from the machining action of the previous train of elementary pulses, the gap can be ready to accept the next train of elementary pulses to continue stabilized machining discharges.

On the other hand, in the interest of increasing the removal rate, it is desirable to have the electrode-feed servo system operate so as to minimize production of non-striking pulses or pulses which do not cause an electrical discharge. In order to facilitate production of discharges by application of successive trains of elementary pulses, the gap can be reduced but this can also facilitate production of a continuous arc or result in a difficulty in gap flushing or decomtamination.

When a continuous arcing, short-circuiting or excessive gap contamination condition arises during a given course the machining operation, it has been recognized to be desirable to stretch or increase either of the off-time $\tau$off of elementary pulses in each train or the cut-off time period Toff between successive trains. Thus, the pulsing power supply may include a timer circuit having a time constant determining the time $\tau$off or Toff varied by a control signal and a sensing circuit may be connected between the machining gap and the timer circuit to respond to a change in the gap condition for providing the control signal which is acted upon the timer circuit for increasing the pulse interval $\tau$off or Toff. When both $\tau$off and Toff are arranged to be variable, it has commonly been believed that they should proportionally be stretched or increased in response to a signal indicating the continuous arcing, short-circuiting or excessive gap contamination condition. These prior recognitions or belief simply derive by way of analogy from the generally accepted practice in an earlier simpler pulsing system using a uniform train of machining pulses whereby, when an abnormal gap condition develops, the pulse interval ($\tau$off) can selectively be controlled with or without a simultaneous change in the pulse duration ($\tau$on). This latter basic control concept is described in U.S. Pat. No. 3,539,755 issued Nov. 10, 1970 and U.S. Pat. No. Re. 29,589 issued Mar. 21, 1978.

The stretching of the $\tau$off or Toff period of both continues for a preselected time interval determined in the timer circuit by the control signal or until after the gap sensor indicates recovery of a normal gap condition. When the gap condition fails to be resumed within the time interval, the control signal is again developed and the stretching control is reestablished or continues.

SUMMARY OF THE INVENTION

The present invention starts with a recognition of problems in the aforementioned control technique, especially for successive trains of elementary pulses or cyclically interrupted elementary pulses having a controllable off-time $\tau$off between successive elementary pulses and a controllable cut-off time interval Toff between successive trains. It has been recognized that a change in mean machining current significantly occurs during the "off" stretching period in which either or both of the time $\tau$off and Toff are increased, and this change and the particular mode of control for successive trains of elementary pulses creates a critical gap instability state which serves both to significantly affect machined results and to unnecessarily prolong the timing of recovery of a normal machining condition and the resumption of a normal cutting mode, hence having imposed a significant restriction in machining performance and efficiency attainable.

It has been discovered that there is a critical relationship to be followed in controlling controllable parameters $\tau$off and Toff in the use of successive trains of elementary pulses to clear an arcing, short-circuiting or excessive gap contamination condition satisfactorily and in a minimum of time. To clear such a condition effectively and efficiently, it has been found, surprisingly, that when one of the off-time $\tau$off between successive elementary pulses and the cut-off period Toff between successive trains is increased to a value greater than a predetermined value, the other can advantageously be decreased. Conversely, when one of them is decreased to a value lower than a predetermined value, the other should be increased.

To allow machining to proceed stably and efficiently under a given setting condition, it is necessary that the off-time $\tau$off lie in a predetermined range and the cut-off period Toff lie above a predetermined value. When the times $\tau$off and Toff deviate from these respective ranges, the resulting discharges tend to shift into a continuous arc. While stretching the time Toff to an unnecessary extent may merely cause a reduction in mean machining current or a prolongation in the total machining time, stretching the time $\tau$off beyond the predetermined limit not only causes prolongation of the machining time but may lead to the reduction in the frequency of electrical discharges to an undesirably low extent. Furthermore, the gap spacing may be abnormally reduced, tending to cause a short-circuiting or arcing.

While the optimum value of pulse off-time $\tau$off and the lower limit of train cut-off period Toff should, of course, vary according to a particular machining purpose and desired end results, these values are also subject to variation during a course of machining operation where the machining area varies or a distribution of the machining liquid fluctuates in the cutting zone.

Extensive investigation by the present inventor has led to the discovery that when the pulse off-time $\tau$off is increased to respond to a need, there is substantially no adverse effect on the successive discharges and there results rather a substantial improvement in machining stability and performance if the train cut-off period Toff is reduced to a certain extent. Conversely, when $\tau$off is reduced, the lower limit of Toff can be raised substantially and advantageously.

Accordingly, the sum of successive pulse off-time $\tau$off periods and train cut-off time Toff periods within a period of successive trains is advantageously held substantially constant. This enables adaptive control of pulse off-time $\tau$off periods such that electrical discharges of an optimum mode successively may develop. Then the train cut-off period Toff may be controlled so as to compensate for a change in the sum of the controlled $\tau$off periods. Conversely, the train cut-off period Toff may be increased or reduced according to a gap requirement and the pulse off periods $\tau$off may be varied to compensate for a change in the varied Toff period without causing an adverse effect on the successive electrical discharges. In this manner, the mean machining current can be held at a desired level, and the total machining time can be reduced to a minimum and be accurately predictable.

In accordance with the present invention, therefore, there is provided, in a first aspect thereof, a method of the electrical-discharge-machining of a workpiece juxtaposed with a tool electrode across a fluid-filled machining gap, the method comprising the steps of: applying across the machining gap a succession of time-spaced trains of elementary machining pulses having an on-time $\tau$on and an off-time $\tau$off, the trains having a duration Ton and a cut-off time interval Toff; and, in response to a gap condition of a first predetermined class, e.g. an arcing, short-circuiting or excessive gap contamination condition, increasing one of the time-off $\tau$off and the cut-off time interval Toff and decreasing the other of said off-time $\tau$off and said cut-off time interval Toff. The said other of off-time $\tau$off and cut-off time Toff may be decreased when said one of off-time $\tau$off and cut-off time interval Toff exceeds a predetermined value.

The method may further include the step of: in response to a gap condition of a second predetermined class, e.g. a recovery of a normal condition from the arcing, short-circuit or excessive gap contamination condition, or an open-gap condition, decreasing one of said off-time $\tau$off and said cut-off time interval Toff and increasing the other of said off-time $\tau$off and said cut-off time interval Toff. The said other of off-time $\tau$off and cut-off time interval Toff may be increased when said one of off-time $\tau$off and cut-off time interval Toff is reduced below a predetermined value.

Preferably, the sum of off-times $\tau$off plus the cut-off time interval Toff in a signal cycle of the trains is maintained substantially constant to maintain the mean machining current at a desired value.

In a second aspect thereof, the invention provides an apparatus for the electrical-discharge machining of a workpiece with a tool electrode across a fluid-filled machining gap, comprising: power supply means for applying across the gap a succession of trains of discrete elementary pulses having an on-time $\tau$on and an off-time $\tau$off, the trains having a duration Ton and a cut-off time interval Toff; gap sensor means for monitoring the conditions of the machining gap to provide a first signal representing a first predetermined condition, e.g. an arcing, short-circuiting or excessive gap contamination condition; and control means associated with the power supply means for increasing one of said off-time $\tau$off and said cut-off time interval Toff in response to said first signal and decreasing the other of said off-time $\tau$off and said cut-off time interval Toff.

The gap sensor may also be adapted to provide a second signal representing a second gap condition, e.g. a recovery from the arcing, short-circuiting or excessive gap contamination condition, or an open-circuit condition, so that the control means may also be responsive to the second signal for decreasing one of said off-time τoff and said cut-off time interval Toff and increasing the other upon development of said second gap condition.

Preferably, setting means is provided for setting each of said off-time τoff and cut-off time interval Toff within a predetermined range. The setting means is preferably adapted to maintain the sum of a total period of the off-times τoff and the cut-off time interval Toff in a single cycle of the trains substantially constant.

BRIEF DESCRIPTION OF DRAWING

For a better understanding of the invention and to show how the same may be carried into effect, reference will now be made, by way of example, to the accompanying drawing, in which.

SPECIFIC DESCRIPTION

Figure 2A:
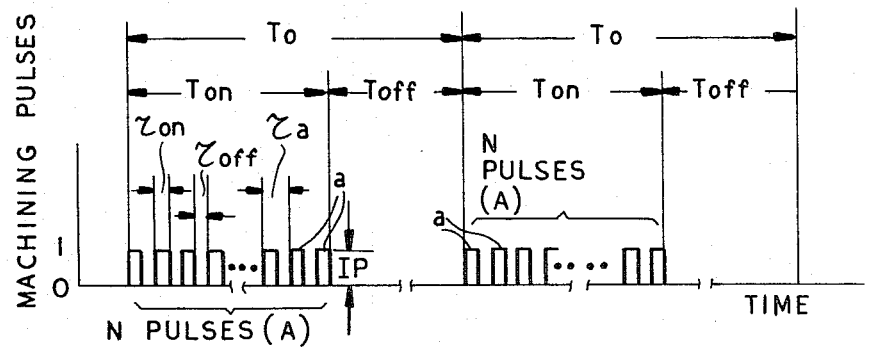
FIG. 2 are time charts illustrating the operation of the apparatus of FIG. 1.

FIG. 2(a) illustrates a succession of trains A of elementary machining pulses a. Each train A is shown comprising an N-number of elementary machining pulses a having a pulse duration or on-time τon, a pulse interval or off-time τoff and a period of $\tau_0 = \tau on + \tau off$. These pulse parameters, together with a pulse peak current Ip, are set in accordance with desired machining results, especially the particular surface finish to be obtained, with electrode materials, polarities and other machining parameters taken into account. Typically, the elementary pulse duration τon is in the range between 0.1 and 100 microseconds and the pulse interval τoff in the range between 0.1 and 50 or even 100 microseconds. Each train A is also shown having a duration Ton, a cut-off time interval Toff and a period To = Ton + Toff. The cut-off time interval Toff need to be sufficient to enable the machining gap to be decontaminated from the preceding discharges (elementary) and ready to accept the succeeding machining pulses a while the duration Ton of each train A interposed between the successive cut-off intervals Toff should be limited within a time period in which elementary pulses a applied with short or minimum intervals τoff are allowed to create dispersive, discrete, independently pulsed discharges without causing a continuous arc discharge which is likely to occur as the machining chips and other products accumulate at the machining gap. Typically, the duration Ton and the interval Toff of trains A are selected from the range between 5 microseconds and 1 millisecond. In accordance with the present invention, the off-time τoff of elementary pulses a and the cut-off interval Toff between successive trains A are controlled in a given machining operation in response to a progress of machining.

Figure 1:
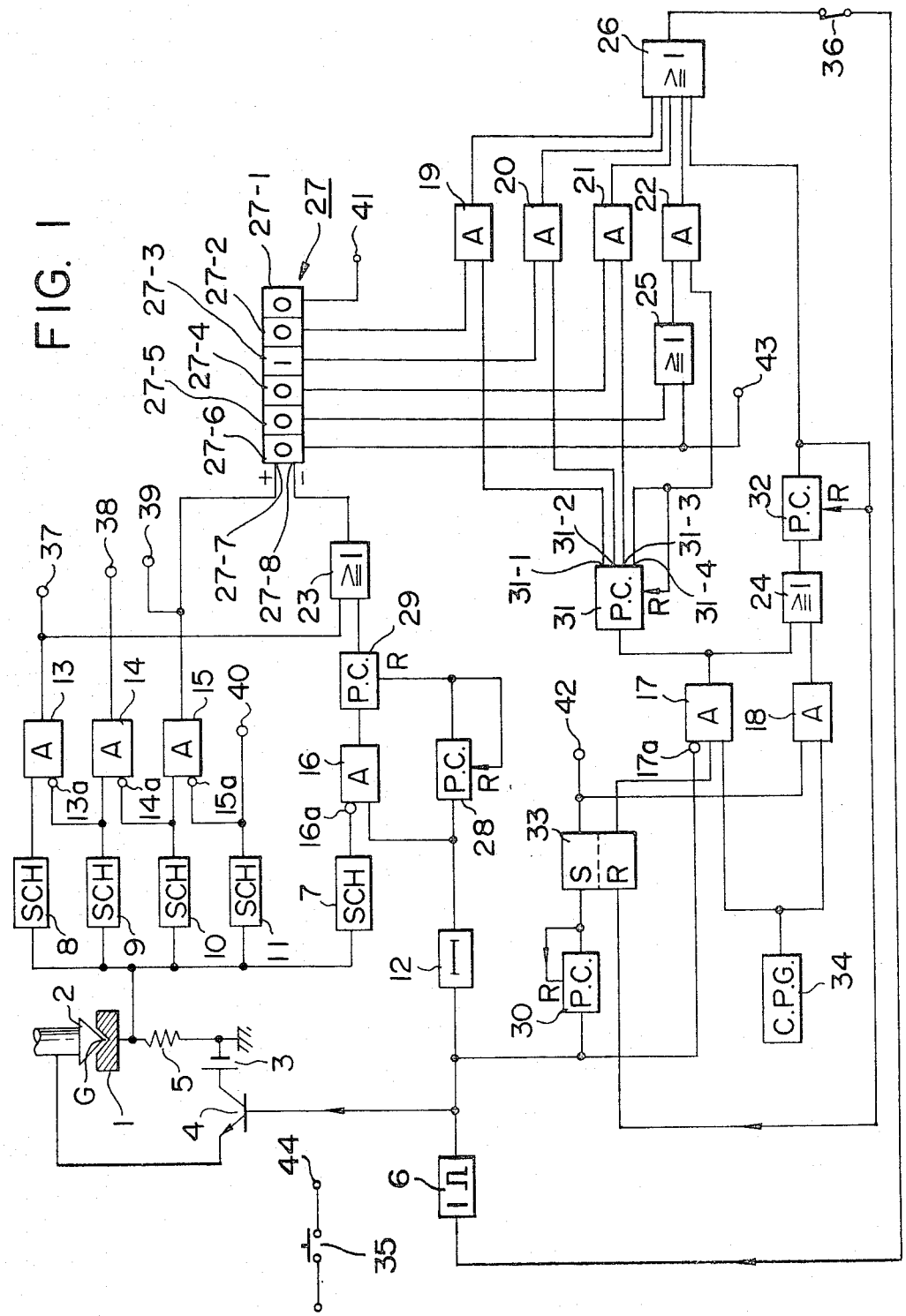
FIG. 1 is a schematic diagram illustrating an apparatus for embodying the present invention.

Referring to FIG. 1 which illustrates a power supply arrangement according to the invention, a tool electrode 1 is shown juxtaposed with a workpiece 2 to form a fluid-filled machining gap G therebetween. A direct-current (DC) power source 3 is connected to the tool electrode 1 and the workpiece 2 in series with a power switch 4, shown as a transistor, and a current-limiting resistor 5 which also serves as means for sensing the discharge current traversing the machining gap G. The tool electrode 1 is shown in the form of a solid, three-dimensional electrode used for machining the workpiece 2 in a sinking or ram-type EDM machine. It will be seen that the tool 1 may also have any other tool form including that of a wire or the like elongate and continuous electrode commonly used in a traveling-wire or wire-cut EDM machine.

Also shown included and arranged to make up the apparatus are: a monostable element 6, Schmitt-trigger circuits 7 to 11, an on-delay circuit 12, AND gates 13 to 22, inverters or NOT gates 13a to 17a, OR gates 23 to 26, an up/down or reversible counter 27, preset counters 28 to 32, an RS bis-table element 33, a clock pulse generator 34, an operation-start push-bottom switch 35, a source switch 36, and output terminals 37 to 44 connected to various control units not shown.

Schmitt trigger circuits 7 to 11 are connected across the sensing resistor 5 for monitoring the discharge current traversing the machining gap G and discriminating gap discharge states one from another.

The Schmitt-trigger circuit 7 has its triggering level set to be at a low value such that it can be triggered without fail when an electrical discharge occurs at the machining gap G, whatever low level is the discharge current. The Schmitt trigger circuit 8 has its triggering level set to correspond to a lowest value of the discharge current which is capable of contributing to material removal. The Schmitt circuits 9 and 10 have their triggering levels set to correspond to the lower and upper values of an optimum range of discharge current, respectively. The Schmitt circuit 11 has its triggering level set to correpond to an upper safety limit of the discharge current. AND gate 13 to 15 combine the discrimination outputs of Schmitt triggers 8 to 11 to furnish control outputs. Thus, when the gap discharge state is favorable, Schmitt circuits 8 and 9 are triggered while Schmitt circuits 10 and 11 remain untriggered. This causes the AND gate 14 to have a "1" output and holds AND gates 13 and 15 to have an "0" output. When the discharge current drops below the lower level of the optimum range, the Schmitt circuit 9 has its state against triggering so that the AND gate 13 has the "1" output and the AND gate 14 has the "0" output. When the discharge current is too high and exceeds the optimum range, the Schmitt circuit 10 is triggered to cause only the AND gate 15 to develop the "1" output and, further when the safety limit is exceeded, the Schmitt circuit 11 is triggered as well so that all of the AND gates 13, 14 and 15 develop the "0" output. Output terminals 37 to 39 are led to an electrode servo-feed unit not shown and the other output terminal 40 is led to an emergency control unit also not shown.

The monostable element 6, which may be constituted by a one-shot multivibrator, provides a succession of high-frequency pulses a to be cyclically interrupted as explained later to form successive trains A as shown in FIG. 2(a) and has an operating on-time corresponding to an on-time τon of the high-frequency pulses.

The preset count level N of the preset counter 30 corresponds to the number of high-frequency pulses a occurring during each duration Ton of successive trains A as shown in FIG. 2. Thus, the counter 30 provides an output pulse each instant the monostable element 6 has completed N-times of triggering. The output pulse is applied to bring the bistable element 33 to a set state for interrupting the high-frequency pulses a. The preset count level N of the counter 30 is set in the range, say, between $2^9$ and $2^{13}$.

The on-delay circuit 12 has an on-time a bit shorter than the on-time $\tau$on of the high-frequency pulses a and permits passage of a terminal portion only of each output pulse of the monostable element 6.

The preset counters 28 and 29 are provided to check the frequency of occurrence of non-striking gap pulses and have their preset count levels M and m, respectively, the level M being sufficiently lower than the level N but much greater than m. For example, $M=2^5$ to $2^8$ and $m=2$ to $2^3$ for $N=2^9$ to $2^{13}$. All successive output pulses of the on-delay circuit 12 are counted by the preset counter 28 and are also applied to the AND gate 16 which is located ahead of the preset counter 29 along a separate channel. The AND gate 16 is in an "enable" state as long as a gap discharge and hence the Schmitt circuit 7 remains untriggered and then passes the output pulses of the on-delay circuits 12 to the preset counter 29. In other words, the counter 28 counts every switching of the power switch 4 whereas the counter 29 selectively counts each gap non-striking pulse. When the frequency of occurrence of non-striking pulses exceeds the ratio m/M an output pulse is issued from the preset counter 29.

The up/down counter 27 is formed with a display in six bits 27-1, 27-2, 27-3, 27-4, 27-5 and 27-6 and has an "up" terminal 27-7 and a "down" terminal 27-8 so that when an input pulse appears at the "up" terminal 27-7, the display is shifted towards the left and when an input pulse develops at the "down" terminal 27-8, the display is shifted towards the right in the arrangement shown.

Figure 2B:
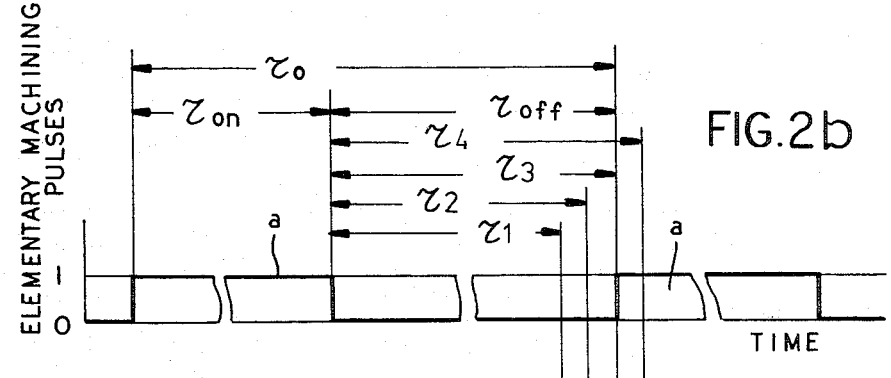
Figure 2C:
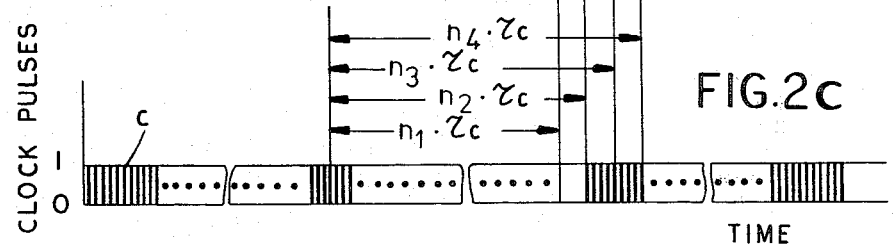

The preset counters 31 and 32 are provided, together with the clock pulse generator 34 for providing a series of clock pulses, to controlledly provide the off-time $\tau$off of high-frequency pulses a shown in FIGS. 2(a) and 2(b) and the cut-off period Toff, respectively, of successive trains A shown in FIG. 2(a). The clock pulses produced by the generator 34 are shown at c in FIG. 2(c) and have a period $\tau$c.

For starting a machining operation, the switches 36 and 35 are turned on. In this state, all the preset counters 28 to 32 and the bistable element 33 are in a reset state. The up/down counter 27 has the display shifted from the first or base position 27-1 to, say, the position 27-3. The clock pulse generator 34 commences operation and the monostable element 6 is actuated to provide an output pulse having a duration $\tau$on. The power switch 4 is thereby turned on to apply an elementary machining pulse a across the machining gap G between the tool electrode 1 and the workpiece 2. Assuming that the pulse results in a favorable electrical discharge, the Schmitt circuits 7, 8 and 9 are triggered while the Schmitt circuits 10 and 11 remain untriggered, permitting the AND gate 14 only to develop the "1" output. Then the output of the on-delay circuit 12 on one hand enters the counter 28 to provide a countup thereof but on the other hand is blocked through the disabled AND gate 16 and hence does not enter the counter 29. Therefore no input develops to the up/down counter 27 and the latter has the display position unchanged.

The output of the monostable element 6 also enters the preset counter 30. Since the RS bistable element 33 is in the reset state, clock pulses c from the generator 34 are incapable of passage through the AND gate 18. The clock pulses c are also incapable of passage through the AND gate 17 which is disabled as long as the output pulse of "1" state of the monostable element 6 exists. Only when the monostable element 6 is returned to the stable state to provide "0" output are the clock c permitted to pass through the AND gate 17 for entry to the counters 31 and 32.

The preset counter 31 is constituted by a multi-stage preset counter for selectively controlling the off-time $\tau$off of the high frequency pulses a and has four output terminals 31-1, 31-2, 31-3 and 31-4. Each time one of the four preset levels of count n1, n2, n3 and n4 is reached, pulse signals develop respectively at the outputs 31-1, 31-2, 31-3 and 31-4 in sequence. In the state shown, pulses issuing from the output terminals 31-1, 31-3 and 31-4 are incapable of passage through the AND gates 19, 21 and 22 in the subsequent stage. Only the pulse from the output terminal 31-2 is allowed passage through the AND gate 20 and the OR gate 26 to trigger the monostable element 6. Accordingly, the off-time $\tau$off established at the monostable element 6 is determined by the display position of the up/down counter 27 and the preset valve n of the preset counter 31 and the period $\tau$c of clock pulses produced by the generator 34. Four different time lengths $\tau$1, $\tau$2, $\tau$3, and $\tau$4 of the off time $\tau$off between successive elementary pulses a are illustrated in FIG. 2(b) as formed from clock pulses c in numbers n1, n2, n3 and n4 shown in FIG. 2(c) and established by n1·$\tau$c, n2·$\tau$c, n3·$\tau$c and n4·$\tau$c, respectively.

The same cycle is repeated by the number of times equal to the number N set at the preset counter 30. When gap discharges develop which are so minute in current level that the Schmit circuit 9 remains untriggered or when non-striking gap pulses are detected at a frequency more than m/M, the display osition of the up/down counter 27 is shifted towards the right in the arrangement shown or towards a bit of lower level. This causes a reduction in the off-time $\tau$off. Conversely, when excessive discharges develop which cause the Schmitt circuit 10 to be triggered, the display position of the up/down counter 27 is shifted towards the left in the arrangement shown or towards a bit of higher level. This causes a widening of the off-time $\tau$off.

When the display position of the counter 27 reaches the bit of the lowest level 27-1, the monostable element 6 operates no longer. At the same time, a signal develops at the terminal 41 and is transmitted to an alarm unit not shown. Conversely, when the bit of the highest level 27-7 is reached, the terminal 43 provides a command signal for operating an electrode reciprocation unit not shown.

In the absence of any of these extreme conditions, the monostable element 6 remains operating recurrently to allow machining to progress. The clock pulses c generated during the off-time off are all counted by and accumulated in the counter 32.

When the foregoing cycle is repeated the number of times equal to the number N set at the counter 30, the latter provides an output pulse which brings the RS bistable element 33 to the set state. The setting signal may be transmitted through the terminal 42 to the electrode servo unit not shown to temporarily halt the servo operation. When the element 33 is reset, the AND gate 17 is disabled and the preset counter 31 ceases counting the clock pulses, hence temporarily halting the operation of the monostable element 6. On the other hand, the clock pulses c are passed through the AND gate 18 and the OR gate 24 and enter the preset counter 32 to operate it.

In other words, a train A of the duration Ton of successive high-frequency pulses a shown in FIG. 2(a)

terminates and the cut-off period Toff commences. The preset counter 32 has a value set in advance corresponding to the total off period Σtoff or the sum of off-times τoff plus the cut-off interval Toff to be included during the single cycle or period To of successive trains A of elementary pulses a and corresponding to the number of clock pulses c to be counted. Thus, at the end of duration Ton, there are the number of clock pulses c already counted corresponding to the sum of off-times τoff of elementary pulses a or Στoff during the single trains A. As a result, Toff=Σtoff−Στoff. Accordingly, given a constant Σtoff, any change in Στoff is effectively compensated for by the correspondingly changing cut-off interval Toff.

Figure 3:
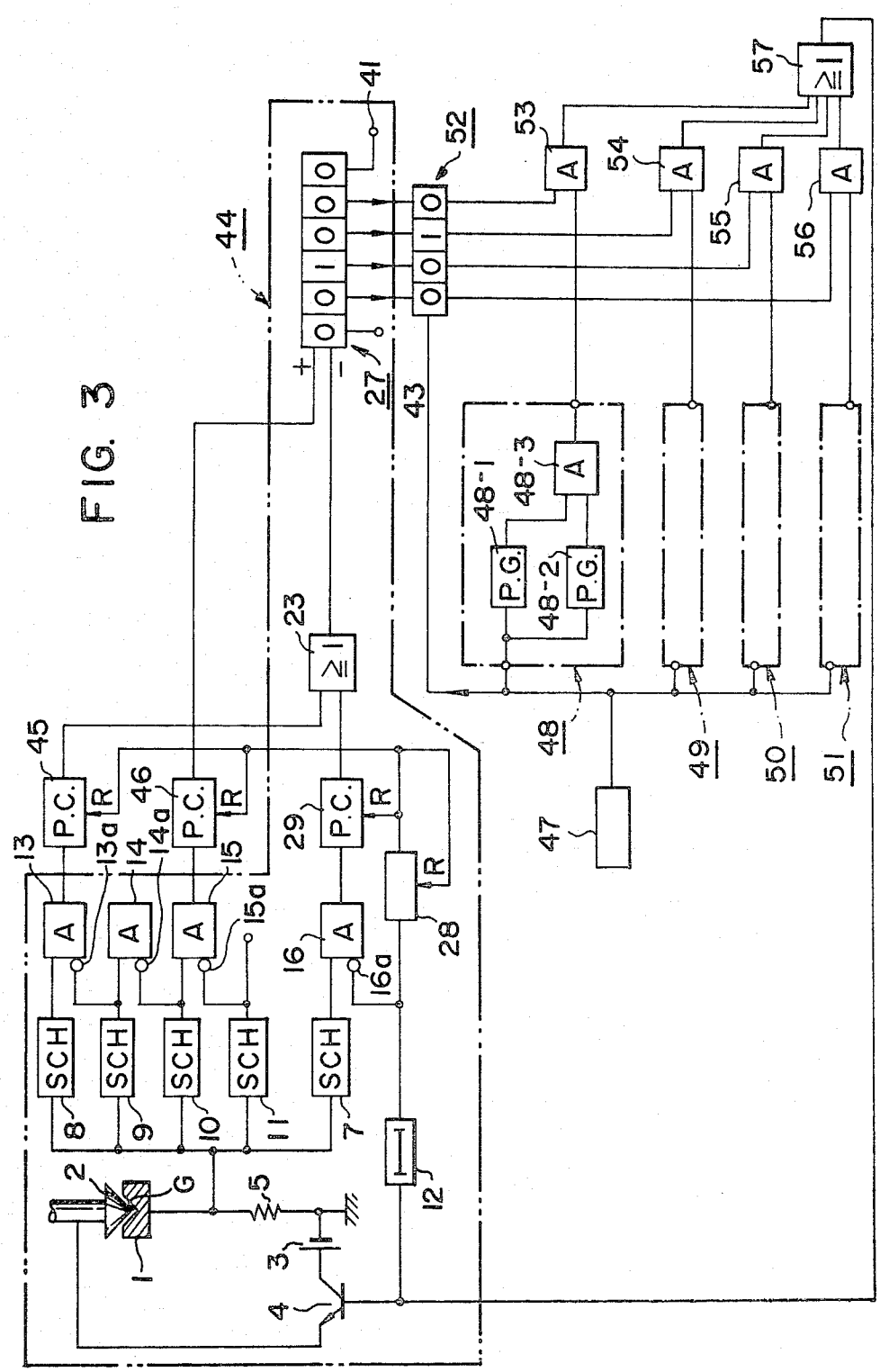
FIG. 3 is a schematic diagram illustrating another embodiment of the present invention.
Figure 4A:
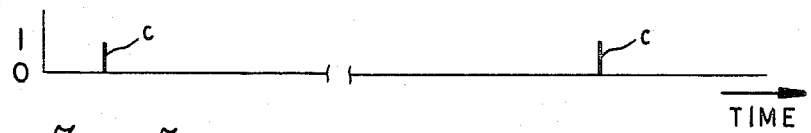
FIG. 4 are time charts illustrating the operation of the apparatus of FIG. 3.
Figure 4B:
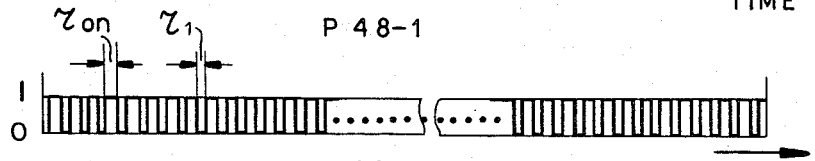
Figure 4C:
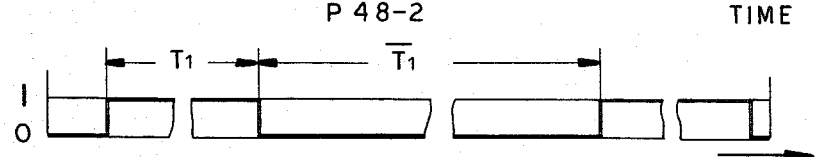
Figure 4D:
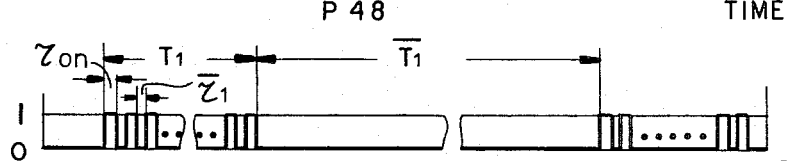
Figure 4E:
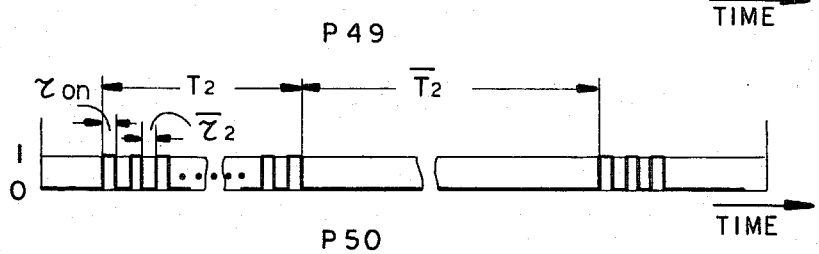
Figure 4F:
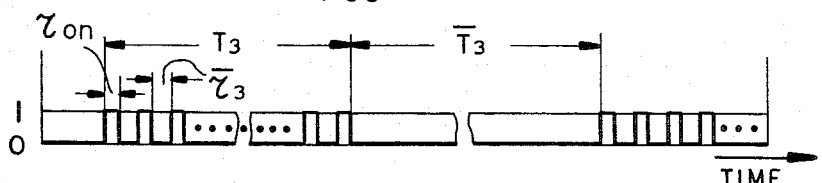
Figure 4G:
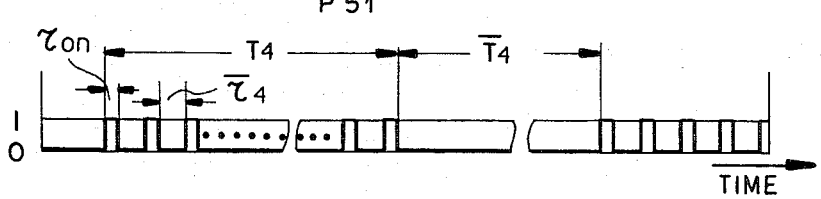

FIG. 3 shows a modification of the arrangement of FIG. 1 wherein circuitry 44 enclosed by a double-dotted chain line corresponds to an assembly of circuits previously shown and described. Counters 45 and 46 having lower values of preset count are additionally included to make the operation of the whole circuitry including the up/down counter 27 moderate. A clock generator 47 and a control pulse generator 48 comprising a high-frequency oscillator 48-1, a low-frequency oscillator 48-2 and an AND gate 48-3 are further included. Control pulse generators 49, 50 and 51 similar to the generator 48 are also shown, together with a register 52, further AND gates 53 to 56 and an OR gate 57.

The output pulse waveforms of the clock generator 47, the high-frequency oscillator 48-1, the low-frequency oscillator 48-2, the control pulse generators 48, 49, 50 and 51 are shown at (a)P47, (b)P48-1, (c)P48-2, (d)P48, (e)P49, (f)p50 and (g)P51 in FIG. 4, respectively.

The control pulse generators 48, 49, 50 and 51 operate in synchronism with clock pulses c produced by the generator 47 to provide different successive trains A of high-frequency pulses a having a fixed on-time τon and the varying off-time τoff=τ̄1, τ̄2, τ̄3 and τ̄4, respectively; the trains having the duration Ton=T1, T2, T3 and T4 and the cut-off interval Toff=T̄1, T̄2, T̄3 and T̄4, respectively.

The register 52 associated with the up/down counter 27 has an input terminal connected to the clock generator 47. Each time a clock pulse c is incoming, the register 50 loads the central four bits of the up/down counter 27. The operation of the entire arrangement will be apparent from the foregoing description. The output of the control generator 48, 49, 50, 51 selected by a display position of the register 52 operates the power switch 4 connecting the power supply 4 to the tool electrode 1 and the workpiece 2 to apply controlled machining pulses across the gap G. The state of discharges at the machining gap G is detected by the circuitry 44 to selectively actuate the control generators 48, 49, 50 and 51.

From the foregoing description it will be appreciated that the present invention provides a novel and useful EDM method and apparatus according to which a machining operation can be effectively and efficiently supervised to allow an improved machining performance and hence yield improved machining results. The mean machining current is advantageously maintained at a desired level without causing a loss in the machining accuracy and the surface roughness that result.

Of course, various modifications or substitutions are possible of the embodiment in the invention shown and described. For example, the number N of elementary pulses a in a single train A, the on-time τon and the peak current Ip of elementary pulses a and the duration Ton of trains A may be variably controlled, individually or in combination, as well as the off-time τoff and the cut-off interval Toff. Various circuit arrangements are also conceivable to those of the ordinary skill in the art in embodying the principles of the invention of which scope for patent protection is solely defined by the appended claims.

What is claimed is:

1. A method of the electrical-discharge-machining of a workpiece juxtaposed with a tool electrode across a fluid-filled machining gap, the method comprising the steps of:
   (a) applying across said machining gap a succession of time-spaced trains of elementary machining pulses having an on-time τon and an off-time τoff, the trains having a duration Ton and a cut-off time interval Toff; and
   (b) in response to a gap condition of a first predetermined class:
      (b₁) increasing one of said off-time τoff and said cut-off time interval Toff, and
      (b₂) also decreasing the other of said off-time τoff and said cut-off time interval Toff.

2. A method as defined in claim 1 wherein in step (b), said other of the off-time τoff and the cut-off time interval Toff is decreased when said one of the off-time τoff and the cut-off time interval exceeds a predetermined value.

3. A method as defined in claim 1 or claim 2, further comprising the steps of: (c) in response to a gap condition of a second predetermined class different from said first predetermined class, (c₁) decreasing said one of the off-time τoff and the cut-off time interval Toff on one hand and (c₂) increasing said other of the off-time τoff and the cut-off time interval Toff on the other hand.

4. A method as defined in claim 3 wherein in step (c), said other of the off-time τoff and the cut-off time interval Toff is increased when said one of the off-time τoff and the cut-off time interval Toff is reduced below a predetermined value.

5. A method as defined in claim 1, further comprising the step of (d) maintaining the sum of said off-times τoff and said cut-off time interval Toff in a single cycle of said trains substantially constant.

6. The method defined in claim 5 wherein in step (b), said other of the off-time τoff and the cut-off time interval Toff is decreased when said one of the off-time τoff and the cut-off time interval Toff exceeds a predetermined value.

7. An apparatus for the electrical-discharge-machining of a workpiece with a tool electrode across a fluid-filled machining gap, comprising:
   power supply means for applying across said gap a succession of trains of discrete elementary pulses having an on-time τon and an off-time τoff, the train having a duration Ton and a cut-off time interval Toff;
   gap sensor means for monitoring the conditions of said machining gap to provide a first gap status signal representing a gap condition of a first predetermined class; and
   control means associated with said power supply means and connected with said gap sensor means, said control means being operable in response to said first gap status signal for increasing one of said off-time τoff and said cut-off time interval Toff on one hand and decreasing the other of said off-time $\tau$off and said cut-off time interval Toff on the other hand.

8. An apparatus as defined in claim 7 wherein said gap sensor means is adapted to provide a second gap status signal representing a gap condition of a second predetermined class different from said first predetermined class and said control means is operable responsive to said second gap status signal for decreasing said one of the off-time $\tau$off and the cut-off time interval Toff on one hand and increasing said other of the on-time $\tau$off and the cut-off time interval Toff on the other hand.

9. An apparatus as defined in claim 7 or claim 8, further comprising setting means for setting at least one of said off-time $\tau$off and said cut-off time interval Toff to vary within a predetermined limited range.

10. An apparatus as defined in claim 9 wherein said setting means is adapted to maintain the sum of the total of off-times $\tau$off and the cut-off time interval Toff in a single cycle of said trains substantially constant.

11. A method of the electrical-discharge-machining of a workpiece juxtaposed with a tool electrode across a fluid-filled machining gap, the method comprising the step of:
  (a) applying across said machining gap a succession of time-spaced trains of elementary machining pulses having an on-time $\tau$on and an off-time $\tau$off, the trains having a duration Ton and a cut-off time interval Toff;
  (b) in response to a gap condition of a first predetermined class, (b$_1$) increasing one of said off-time $\tau$off and said cut-off time interval Toff on one hand and (b$_2$) decreasing the other of said off-time $\tau$off and said cut-off time interval Toff on the other hand;
  (c) in response to a gap condition of a second predetermined class different from said first predetermined class, (c$_1$) decreasing said one of the off-time $\tau$off and the cut-off time interval Toff on one hand and (c$_2$) increasing said other of the off-time $\tau$off and the cut-off time interval Toff on the other hand; and
  (d) maintaining the sum of said off-times $\tau$off and said cut-off time interval Toff in each cycle of said trains substantially constant.

12. The method defined in claim 11 wherein in step (b), said other of the off-time $\tau$off and the cut-off time interval Toff is decreased when said one of the off-time $\tau$off and the cut-off time interval Toff exceeds a predetermined value.

13. The method defined in claim 11 wherein in step (c), said other of the off-time $\tau$off and the cut-off time interval Toff is increased when said one of the off-time $\tau$off and the cut-off time interval Toff is reduced below a predetermined value.

14. The method defined in claim 11 wherein in step (b), said other of the off-time $\tau$off and the cut-off time interval Toff is decreased when said one of the off-time $\tau$off and the cut-off time interval Toff exceeds a first predetermined value and in step (c), said other of the off-time $\tau$off and the cut-off time interval Toff is increased when said one of the off-time $\tau$off interval Toff is reduced below a second predetermined value.

15. A method as defined in claim 1 or claim 11 wherein said on-time $\tau$on ranges between 0.1 and 100 microseconds and said duration Ton ranges between 5 microseconds and 1 millsecond.

* * * * *